United States Patent
Aslett et al.

(10) Patent No.: US 10,852,408 B2
(45) Date of Patent: Dec. 1, 2020

(54) FREQUENCY-MODULATED CONTINUOUS-WAVE (FMCW)

(71) Applicant: Siemens Aktiengesellschaft, Munich (DE)

(72) Inventors: Alan Aslett, Peterborough (CA); Johannes Theodorus Cornelis Duivenvoorden, Trent River (CA); Jing Liu, Peterborough (CA); Mihai-Gabriel Serban, North York (CA)

(73) Assignee: Siemens Aktiengesellschaft, Munich (DE)

( * ) Notice: Subject to any disclaimer, the term of this patent is extended or adjusted under 35 U.S.C. 154(b) by 466 days.

(21) Appl. No.: 15/001,399

(22) Filed: Jan. 20, 2016

(65) Prior Publication Data

US 2016/0245909 A1 Aug. 25, 2016

(30) Foreign Application Priority Data

Feb. 23, 2015 (EP) ..................................... 15156085

(51) Int. Cl.
*G01S 13/34* (2006.01)
*G01F 23/284* (2006.01)
(Continued)

(52) U.S. Cl.
CPC ............ *G01S 13/34* (2013.01); *G01F 23/284* (2013.01); *G01S 7/4056* (2013.01); *G01S 3/48* (2013.01);
(Continued)

(58) Field of Classification Search
CPC ...... G01S 13/931; G01S 13/345; G01S 13/34; G01S 7/354; G01S 7/4008; G01S 13/347;
(Continued)

(56) References Cited

U.S. PATENT DOCUMENTS 5,198,748 A * 3/1993 Tsui ...................... G01R 23/00
324/76.21
5,982,321 A 11/1999 Iihoshi et al.
(Continued)

FOREIGN PATENT DOCUMENTS

CN 1396464 2/2003
CN 1898578 1/2007
(Continued)

OTHER PUBLICATIONS

French R. C. "Transfer Function Measurement Using Fast Pulses"; Electronic Engineering; Morgan-Grampian Ltd. London, GB; pp. 516-519; XP009017627; I SSN: 0013-4902;; 1996; the whole document.

(Continued)

*Primary Examiner* — Olumide Ajibade Akonai
(74) *Attorney, Agent, or Firm* — Cozen O'Connor

(57) ABSTRACT

A frequency-modulated continuous-wave (FMCW) radar system for level or distance measurement in which a frequency modulated signal to be transmitted to a target is mixed with an echo signal from the target to produce a beat signal that passes through an analog filter before being digitized and processed in a digital processor to determine the level or distance to be measured, where a test signal is generated by a signal generator, and a switch is controlled to connect the beat signal or the test signal to the analog filter, the signal generator generates the test signal as a broadband signal having a periodic waveform, e.g., a square wave, and the digital processor calculates a spectrum of the digitized filtered test signal by Fast Fourier Transform and generates a fault signal if the spectrum differs from a reference spectrum by a predetermined amount to allow for failure detection.

7 Claims, 1 Drawing Sheet

(51) Int. Cl.
*G01S 7/40* (2006.01)
*G01S 13/931* (2020.01)
*G01S 3/48* (2006.01)

(52) U.S. Cl.
CPC ..... *G01S 13/931* (2013.01); *G01S 2007/4073* (2013.01)

(58) Field of Classification Search
CPC .. G01S 13/56; G01S 2007/356; G01S 7/4056; G01S 13/24; G01S 1/306; G01S 7/292; G01S 2007/4073; G01S 3/48; G01S 7/034
See application file for complete search history.

(56) References Cited

U.S. PATENT DOCUMENTS

| | | | | |
|---|---|---|---|---|
| 6,087,980 | A * | 7/2000 | Saryo | G01S 7/034 342/128 |
| 6,445,339 | B1 * | 9/2002 | Yamada | G01S 13/345 342/128 |
| 7,283,034 | B2 * | 10/2007 | Nakamura | B60R 25/246 340/5.72 |
| 2003/0016163 | A1 * | 1/2003 | Isaji | G01S 7/35 342/70 |
| 2005/0007271 | A1 | 1/2005 | Isaji | |
| 2006/0244654 | A1 | 11/2006 | Cheng et al. | |
| 2007/0052581 | A1 | 3/2007 | Shima | |
| 2009/0096661 | A1 | 4/2009 | Sakamoto | |
| 2011/0011181 | A1 * | 1/2011 | Leung | G01P 9/00 73/504.05 |
| 2011/0181458 | A1 * | 7/2011 | Feil | G01F 23/284 342/124 |
| 2012/0235859 | A1 * | 9/2012 | Hayase | G01S 7/4008 342/189 |
| 2013/0082869 | A1 * | 4/2013 | Jaeger | G01S 7/4052 342/165 |
| 2015/0097715 | A1 | 4/2015 | Schultheiss | |
| 2015/0145714 | A1 * | 5/2015 | Watanabe | G01S 13/38 342/107 |

FOREIGN PATENT DOCUMENTS

| | | |
|---|---|---|
| CN | 101271159 | 9/2008 |
| CN | 101807077 | 8/2010 |
| CN | 104272065 | 1/2015 |
| EP | 0886149 | 12/1998 |
| EP | 2660568 | 11/2013 |
| JP | 2005-030809 | 2/2005 |
| WO | WO 2013/164456 | 11/2013 |
| WO | WO 2013164456 | 11/2013 |

OTHER PUBLICATIONS

Kroeger H. et al.: "Lineare Systeme mit rationales Übertragungsfunktion im Falle zweier Polstellen bei Erregung durch einen periodischen Rechteckpuls"; ATM Archly für technisches Messen und Industriellenmesstechnik; Oldenbourg Verlag München; DE; No. 413; pp. 131-134; XP009017752, ISSN: 0365-7418;; 1970; the whole document.
Karrenberg U.: "Kapitel 6: Systemanalyse; Signale Prozesse Systeme"; Springer-Verlag; XP055200378; ISSN: 0012-0472; ISBN: 978-3-54-041769-9; pp. 141-174; 2001; the whole document.
Office Action dated Sep. 28, 2017 which issued in the corresponding Chinese Patent Application No. 201610037262.4.
Office Action dated Feb. 26, 2018 which issued in the corresponding Chinese Patent Application No. 201610037262.4.
Office Action dated Jul. 23, 2018 which issued in the corresponding Chinese Patent Application No. 201610037262.4.
Office Action dated Jan. 11, 2019 issued in Chinese Patent Application No. 201610037262.4.

\* cited by examiner

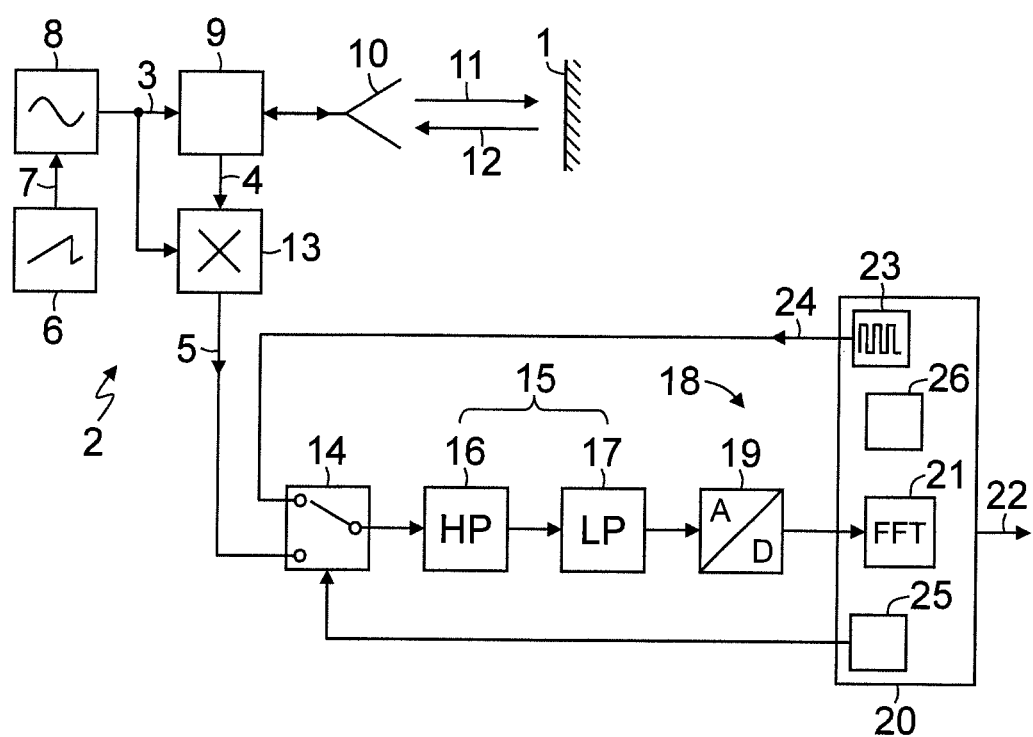

FREQUENCY-MODULATED CONTINUOUS-WAVE (FMCW)

BACKGROUND OF THE INVENTION

1. Field of the Invention

The invention relates to a Frequency-Modulated Continuous-Wave (FMCW) radar system for level or distance measurement, comprising a transmitter/receiver for generating a frequency modulated signal to be transmitted to a target and for mixing an echo signal received from the target with the generated frequency modulated signal to produce a beat signal, an analog filter for filtering the beat signal, a digital processor for digitizing and processing the filtered and digitized beat signal to determine the level or distance to be measured, a signal generator controlled by the digital processor for generating a test signal, and a switch controllable to connect the beat signal or the test signal to the analog filter.

2. Description of the Related Art

WO 2013/164456 A1 discloses a Frequency-Modulated Continuous-Wave (FMCW). As echoes in the short measurement range of this type of system generally have much higher amplitudes than echoes that come from further away, the analog filter has a high-pass characteristic to reduce the dynamic range of the beat signal. The filter function, however, can affect the curve of the beat signal and, thus, the accuracy of the measurement. In such a conventional FMCW radar system, the signal generator generates a reference signal that is used to correct errors of the filtered and digitized beat signal, where the errors are caused by the analog filter. To this end, the reference signal is swept from 0 Hz to the highest occurring beat frequency and the filter function (with attenuation and phase response) is recorded by the digital processor. From this data, an inverse filter function is calculated and used to correct the digitized sampled values of the beat signal obtained during the level or distance measurement.

For a product to be approved according to the International Electrotechnical (IEC) Standard 61508, it is necessary to calculate the probability of undetected failures in electronic circuits using a Failure Modes, Effects and Diagnostic Analysis (FMEDA). Different failure modes are applied to each part in the circuit and the effect is analyzed. Effects are classified as to the impact they will have on the product performance and whether the failure can be reliably detected. The probability that a failure will be detected can be increased by including diagnostic circuitry that can detect whether a circuit or parts of it have failed, and thus avoid the need for a complex component by component analysis of the effects of different failure modes. Filter circuits are particularly difficult to analyze in this way, because it is difficult to predict the effect of a change in a component value. This is particularly the case for the analog filter of an FMCW radar system. The beat signal is a complex waveform consisting of several frequency components that depend on the target conditions. Moreover, the filter has the double function of improving the dynamic range of the beat signal by increasing the gain as the measurement range increases and anti-aliasing to remove high frequency components from the beat signal before digitizing and processing of the beat signal is performed. All this results in a complex filter design, which negatively affects the probability of a failure being detected.

SUMMARY OF THE INVENTION

It is therefore an object of the present invention to allow for simple failure detection in a Frequency-Modulated Continuous-Wave (FMCW) radar system.

This and other objects and advantages are achieved in accordance with the invention by an FMCW radar system in which a signal generator is configured to generate a test signal in the form of a periodic waveform signal with a broadband spectrum, and a digital processor is configured to calculate a spectrum of the digitized filtered test signal by Fast Fourier Transform (FFT) and to generate a fault signal if the calculated spectrum differs from a reference spectrum by a predetermined amount.

It is to be understood that, within the meaning of the present invention, the term switch may include equivalent elements, such as a summer which, by control, receives either the beat signal or the test signal.

The broadband signal is to be understood to be a multi-harmonic signal, i.e., a signal that contains a multiplicity of harmonics at the same time, such as a square wave, triangle wave, or a series of spike pulses. In particular, the square wave is advantageously rich in defined harmonics and can be easily generated by a microcontroller. Here, the signal generator may be included in the digital processor such that a separate signal generator is not required. A series of positive and negative spike pulses may be produced by differentiation of a square wave.

The resulting spectrum of the digitized filtered test signal calculated by Fast Fourier Transform is already the response of the filter at discrete frequencies. Thus, in accordance with the invention, the response of the filter is calculated in one step, and there is no necessity for a swept-frequency test signal.

In a preferred embodiment of the FMCW radar system, the digital processor is configured to initially process the digitized filtered beat signal in a Fast Fourier Transform step so that a frequency spectrum or echo profile in the frequency-domain is obtained that is further analyzed to determine the target distance to be measured. Here, the evaluation of the test signal, after having passed through the filter, is based on and takes advantage of an evaluation capability that is already included in the FMCW radar system.

The reference spectrum, to which the calculated spectrum of the digitized filtered test signal is compared, is preferably recorded in the device. To this end, the digital processor may include a memory for storing a calculated spectrum of the test signal as the reference spectrum during manufacture or calibration of the system.

As the amplitude of the harmonics of the test signal decreases with the harmonic order, it may be difficult to reliably detect harmonics with a very high order. Therefore, in order to cover the entire frequency range of the filter, it may be advantageous to run the test in two or more steps, where the periodic waveform signal is applied at different fundamental frequency in each step (e.g., apply a 200 Hz square signal and measure harmonics up to 2 kHz, then apply 2 kHz and measure harmonics up to 100 kHz).

In accordance with the invention, a fault signal is generated if the currently calculated spectrum of the digitized filtered test signal differs from a reference spectrum by a predetermined amount. The fault signal may be output by the FMCW radar system as an alarm. The digital processor may preferably additionally or alternatively place the FMCW radar system into a fail-safe state upon generation of the fault signal. The test of the filter is preferably performed with a repetition period less than or equal to a predetermined fault reaction time of the FMCW radar system.

The invention allows the diagnosis of a failure in the beat signal filter of an FMCW radar by providing a simple way to characterize the filter and determine if the filter characteristic has changed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be now described in more detail with reference to a preferred embodiment shown by way of non-limiting exemplary drawing, in which:

The FIGURE is a simplified schematic diagram of a Frequency-Modulated Continuous-Wave (FMCW) radar system.

DETAILED DESCRIPTION OF THE EXEMPLARY EMBODIMENTS

The FIGURE shows a functional block diagram of a Frequency-Modulated Continuous-Wave (FMCW) radar system for measuring the distance of a target 1 such as the filling level of a material in a container. The system comprises a transmitter/receiver 2 for generating a frequency modulated signal 3 to be transmitted to the target 1 and for mixing an echo signal 4 received from the target 1 with the generated frequency modulated signal 3 to produce a beat signal 5. To this end, a function generator 6 periodically generates a linear, e.g., triangular or sawtooth-shaped, modulation function 7 for controlling a voltage-controlled microwave oscillator 8 that generates the frequency modulated signal 3. The microwave signal 3 is supplied via a circulator or directional coupler 9 to an antenna 10 from which it is transmitted as a transmit signal 11 to the target 1. The echo 12 from the target 1 is received by the antenna 10 as the echo signal 4 after a propagation time proportional to the distance to be measured. The received echo signal 4 is directed by the circulator or directional coupler 9 to a mixer 13, in which the received echo signal 4 is mixed with the frequency modulated signal 3 to generate the beat signal 5. During the propagation time, the frequency of the signal 3 has changed due to its frequency modulation so that the signal 3 and the received echo signal 4 have different frequencies. Therefore, the beat signal 5 has a frequency corresponding to the difference of the frequencies of the signals 3 and 4. The frequency modulation of the transmit signal 3 is linear over time. As a result, the frequency of the beat signal 5 is directly proportional to the distance to be measured. However, in measurement practice, the quality of the beat signal 5 is affected by unwanted echoes (clutter) so that the beat signal 5 is a complex waveform consisting of many frequency components.

The beat signal 5 is fed via a switch 14 through an analog filter 15 which has a high pass filter 16 for reducing the dynamic range of the beat signal 5 and a low pass filter 17 for anti-aliasing purposes. The filtered beat signal 5 is then provided to a digital processor 18 comprising an analog-to-digital converter 19 and a microcontroller 20. In the microcontroller 20, the filtered and digitized beat signal 13 is subjected to a Fast Fourier Transform (FFT) algorithm 21 to obtain a frequency spectrum or echo profile that is further analyzed to determine the target distance to be measured and provide the determined target distance at an output 22.

The microcontroller 20 includes a signal generator 23 that generates a test signal 24, here in the form of a square wave. The microcontroller 20 further includes a timer 25 that controls the switch 14 to intermittently disconnect the beat signal 5 from the analog filter 15 and instead connect the test signal 24 to the analog filter 15. The microcontroller 20 calculates a spectrum of the digitized filtered test signal 5 by using the FFT algorithm 21 and generates a fault signal if the calculated spectrum differs from a reference spectrum by a predetermined amount. The square wave test signal 24 is rich in Harmonics. Consequently, the resultant spectrum calculated is already the filter response at discrete frequencies.

There are many ways to compare the currently obtained spectrum or filter response with the reference spectrum. For example, an envelope of the peaks of the spectrum may be calculated and compared with a corresponding envelope of the reference spectrum. An allowable variation of the envelope of the currently obtained spectrum may be selected as a tolerance band defined above and below the envelope of the reference spectrum. The reference spectrum or, in the present example, its envelope is determined once during manufacturing or calibration of the FMCW radar system and stored in a memory 26 of the microcontroller 20. The fault signal may be output via output 22 as an alarm and/or used to place the FMCW radar system into a fail-safe state. The time during which the test signal 24 is fed to the filter 5 should be sufficiently long to capture a steady-state filter response (e.g., 10 ms at a 2 kHz square wave test signal 24). The repetition period between two consecutive test signals 24 applied to the filter 5 is less than or equal to a predetermined fault reaction time of the FMCW radar system (e.g. 20 s).

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A frequency-modulated continuous wave (FMCW) radar system for level or distance measurement, comprising:
   a transmitter/receiver for generating a frequency modulated signal to be transmitted to a target and for mixing an echo signal received from the target with the generated frequency modulated signal to produce a beat signal;
   an analog filter for filtering the produced beat signal;
   a digital processor including a microcontroller, said digital processor digitizing the filtered beat signal and processing the filtered and digitized beat signal to determine the level or distance to be measured;

a signal generator arranged in the microcontroller, said signal generator being controlled by the digital processor for generating a test signal comprising a square wave;

a switch controllable to connect one of (i) the beat signal and (ii) the test signal comprising the square wave to the analog filter; and a timer arranged in the microcontroller of the digital signal processor, said timer controlling the switch to intermittently disconnect the beat signal from the analog filter and connect the test signal to the analog filter;

wherein the signal generator is configured to generate the test signal comprising the square wave as a periodic waveform signal having a broadband spectrum; and wherein the digital processor is configured to calculate a spectrum of a digitized filtered test signal comprising the square wave by Fast Fourier Transform and to generate a fault signal which is utilized to place the FMCW radar system into a fail-safe state if the calculated spectrum differs from a reference spectrum by a predetermined amount.

2. The FMCW radar system of claim 1, wherein the digital processor is configured to initially process the digitized filtered beat signal in a Fast Fourier Transform step.

3. The FMCW radar system of claim 1, wherein the signal generator is one of included in the digital processor or controlled by the digital processor.

4. The FMCW radar system of claim 1, wherein the digital processor is further configured to control the signal generator to generate the periodic waveform signal at different fundamental frequencies.

5. The FMCW radar system of claim 1, wherein the digital processor is further configured to place the FMCW radar system into a fail-safe state upon generation of the fault signal.

6. The FMCW radar system of claim 1, wherein the signal generator is configured to generate the test signal comprising the square wave with a repetition period less than or equal to a predetermined fault reaction time of the FMCW system.

7. The FMCW radar system of claim 1, wherein the digital processor includes a memory for storing a calculated spectrum of the test signal comprising the square wave as the reference spectrum during manufacture or calibration of the system.

* * * * *